United States Patent
Kang et al.

(10) Patent No.: US 12,230,842 B2
(45) Date of Patent: Feb. 18, 2025

(54) ELECTRODE FOR LITHIUM SECONDARY BATTERY AND METHOD OF MANUFACTURING THE SAME

(71) Applicant: SK INNOVATION CO., LTD., Seoul (KR)

(72) Inventors: Yong Hee Kang, Daejeon (KR); Byung Chan Kang, Daejeon (KR); Sung Jun Park, Daejeon (KR); Byung Wook Jo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 322 days.

(21) Appl. No.: 17/509,793

(22) Filed: Oct. 25, 2021

(65) Prior Publication Data
US 2022/0149491 A1    May 12, 2022

(30) Foreign Application Priority Data

Nov. 6, 2020 (KR) .......... 10-2020-0147990
Oct. 12, 2021 (KR) .......... 10-2021-0134755

(51) Int. Cl.
*H01M 50/534* (2021.01)
*H01M 4/04* (2006.01)
*H01M 10/0525* (2010.01)

(52) U.S. Cl.
CPC ....... *H01M 50/534* (2021.01); *H01M 4/0402* (2013.01); *H01M 4/0435* (2013.01); *H01M 4/0471* (2013.01); *H01M 10/0525* (2013.01)

(58) Field of Classification Search
CPC ............. H01M 50/534; H01M 4/0402; H01M 4/0435; H01M 4/0471; H01M 10/0525
See application file for complete search history.

(56) References Cited

U.S. PATENT DOCUMENTS

2011/0039138 A1   2/2011   Jeong et al.
2012/0288756 A1   11/2012   Kim
(Continued)

FOREIGN PATENT DOCUMENTS

CN    102113151 A    6/2011
CN    109686915 A    4/2019
(Continued)

OTHER PUBLICATIONS

Extended European Search Report issued by the European Patent Office on Mar. 28, 2022.
(Continued)

*Primary Examiner* — Brian R Ohara
*Assistant Examiner* — Patrick Marshall Greene
(74) *Attorney, Agent, or Firm* — IP & T GROUP LLP (57) ABSTRACT

An electrode for lithium secondary battery and a method of manufacturing the same are disclosed. The electrode for lithium secondary battery comprised of an electric collector formed of a metal and a slurry coated on a portion of the electric collector includes a coated part including the portion of the electric collector, on which the slurry is coated, and the slurry, and an uncoated part including a remaining portion of the electric collector on which the slurry is not coated. The uncoated part includes a first uncoated part extended from the coated part and a second uncoated part extended from the first uncoated part and including a tab connection portion coupled to an electrode tab. A tensile strength of the first uncoated part is greater than a tensile strength of the tab connection portion.

4 Claims, 5 Drawing Sheets

(56) References Cited

U.S. PATENT DOCUMENTS

| | | |
|---|---|---|
| 2016/0056420 A1 | 2/2016 | Jeong |
| 2020/0014020 A1 | 1/2020 | Lee et al. |
| 2023/0170478 A1* | 6/2023 | Seo .................. H01M 4/505 |
| | | 429/231.95 |
| 2023/0369604 A1* | 11/2023 | Zhai ................ H01M 10/0525 |

FOREIGN PATENT DOCUMENTS

| | | |
|---|---|---|
| JP | 2000251942 A | 9/2000 |
| JP | 2007-273390 A | 10/2007 |
| JP | 2011-241410 A | 12/2011 |
| JP | 2013246971 A | 12/2013 |
| JP | 2014053134 A | 3/2014 |
| JP | 2019-102172 A | 6/2019 |
| KR | 10-0823198 B1 | 4/2008 |
| KR | 10-2011-0017761 A | 2/2011 |
| KR | 10-2017-0137355 A | 12/2017 |
| KR | 10-2020-0059001 A | 5/2020 |

OTHER PUBLICATIONS

Office Action of Chinese Patent Application No. 202111304509.1 issued by the Chinese Patent Office on Apr. 27, 2023.
Office Action for the Japanese Patent Application No. 2021-179982 issued by the Japanese Patent Office on Jan. 16, 2024.

* cited by examiner

|  | Tensile strength $=19\text{kg}_f/\text{mm}^2$ | Tensile strength $=14\text{kg}_f/\text{mm}^2$ | Tensile strength $=10\text{kg}_f/\text{mm}^2$ |
|---|---|---|---|
| 51(50) Electrode density 3.55g/cc 40 | | | |
| Electrode density 3.65g/cc | | | |

ELECTRODE FOR LITHIUM SECONDARY BATTERY AND METHOD OF MANUFACTURING THE SAME

CROSS-REFERENCE TO RELATED APPLICATIONS

This application claims the priority benefit of Korean Patent Application Nos. 10-2020-0147990 filed on Nov. 6, 2020 and 10-2021-0134755 filed on Oct. 12, 2021, which are incorporated herein by reference for all purposes as if fully set forth herein.

TECHNICAL FIELD

The present disclosure relates to an electrode for lithium secondary battery and a method of manufacturing the same.

BACKGROUND

A general secondary battery refers to a battery that can be charged and discharged, unlike a primary battery that cannot be charged, and is widely used in electronic devices such as mobile phones, notebook computers, and camcorders, or electric vehicles. In particular, a lithium secondary battery has an operating voltage of about 3.6V, has about three times the capacity of a nickel-cadmium battery or a nickel-hydrogen battery which is often used as a power source for electronic equipment, and has a high energy density per unit weight. Therefore, the use of the lithium secondary battery is explosively increasing.

In order to implement a battery cell with a high capacity and a high density of the battery during a manufacturing process of the secondary battery, a rolling process is important in an electrode process. The rolling process refers to a process in which an electrode passes between a pair of rollers in an electrode process and is pressed to a design thickness of a target battery cell.

However, in the rolling process, wrinkles and fractures due to partial deformation of the electrode increase, which greatly affects quality and productivity of the products, and thus improvement is required.

SUMMARY

One aspect of the present disclosure provides an electrode for lithium secondary battery with improved structure and a method of manufacturing the same.

Another aspect of the present disclosure provides an electrode for lithium secondary battery with improved quality and a method of manufacturing the same.

In order to achieve the above-described and other objects, in one aspect of the present disclosure, there is provided an electrode for lithium secondary battery comprised of an electric collector formed of a metal and a slurry coated on a portion of the electric collector, the electrode for lithium secondary battery comprising a coated part including the portion of the electric collector, on which the slurry is coated, and the slurry; and an uncoated part including a remaining portion of the electric collector on which the slurry is not coated, wherein the uncoated part includes a first uncoated part extended from the coated part; and a second uncoated part extended from the first uncoated part, the second uncoated part including a tab connection portion coupled to an electrode tab, wherein a tensile strength of the first uncoated part is greater than a tensile strength of the tab connection portion, and wherein a ratio of the tensile strength of the first uncoated part to a tensile strength of the portion of the electric collector on which the slurry is coated is 0.65 to 0.85.

In another aspect of the present disclosure, there is provided a method (S100) of manufacturing an electrode for lithium secondary battery comprised of an electric collector formed of a metal and a slurry coated on a portion of the electric collector, the method (S100) comprising a slurry coating step (S110) of coating the slurry on at least one surface of the electric collector and dividing the electrode for lithium secondary battery into a coated area on which the slurry is coated and an uncoated area on which the slurry is not coated, wherein the uncoated area includes a first uncoated part adjacent to the coated area, a tab connection portion connected to the first uncoated part and coupled to an electrode tab, and a cut portion extended from the tab connection portion; a heating step (S120) of heating the cut portion; and a rolling step (S130) of rolling the heated electrode, wherein a ratio of a tensile strength of the first uncoated part to a tensile strength of the electric collector of the coated area is 0.65 to 0.85.

According to one aspect of the present disclosure, the present disclosure can minimize generation of electrode wrinkles in a battery cell.

According to one aspect of the present disclosure, the present disclosure can prevent a sticking problem in a process of connecting an electrode tab to an electrode of a battery cell.

According to one aspect of the present disclosure, the present disclosure can minimize a fracture of an electrode of a battery cell in a rolling process.

According to one aspect of the present disclosure, the present disclosure can prevent an electrode failure of a battery cell.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

The detailed description and specific examples such as embodiments of the present disclosure are given merely by way of example, since various changes and modifications within the spirit and scope of the present disclosure will become apparent to those skilled in the art from the detailed description.

Wherever possible, the same reference numbers will be used throughout the drawings to refer to the same or like parts or components.

Terms used in the present disclosure are used to explain embodiments and are not intended to limit and/or restrict the present disclosure. A singular expression can include a plural expression as long as it does not have an apparently different meaning in context. In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

The terms including an ordinal number such as "first", "second", etc. may be used to describe various components, but the components are not limited by such terms. The terms are used only for the purpose of distinguishing one component from other components. For example, a first component may be referred to as a second component without departing from the spirit and scope of the present disclosure, and a second component may be referred to as a first component in the same manner. The term "and/or" includes a combination of items related to plurality or some of items related to plurality.

In addition, term such as "part", "device", "block", "member", and "module" may refer to a unit processing at least one function or operation. For example, the terms may mean at least one hardware such as field-programmable gate array (FPGA)/application specific integrated circuit (ASIC), at least one software stored in a memory, or at least one process processed by a processor.

Reference will now be made in detail to embodiments of the disclosure, examples of which are illustrated in the accompanying drawings. The accompanying drawings illustrate embodiments of the present disclosure and are used to help easily understand various technical features, and it should be understood that embodiments presented herein are not limited by the accompanying drawings.

Figure 1:
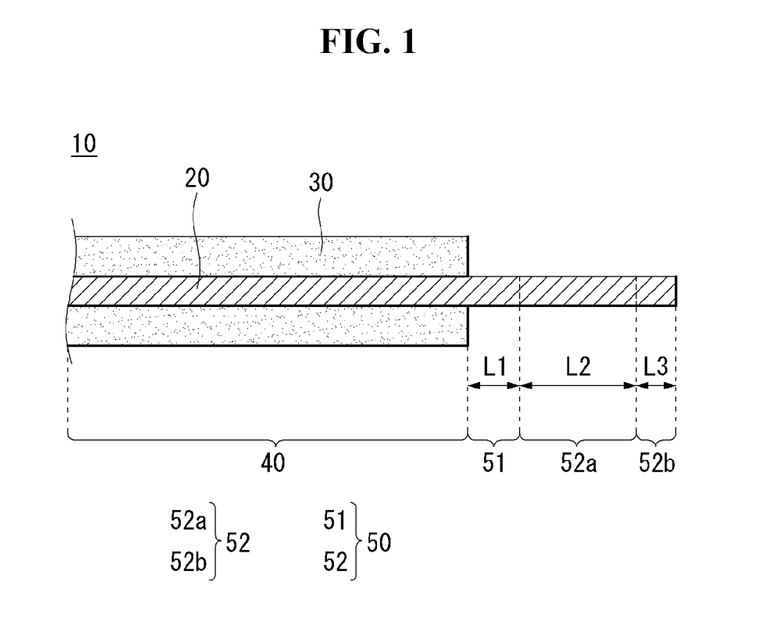
FIG. 1 is a cross-sectional view of an electrode according to an embodiment of the present disclosure.

Referring to FIG. 1, an electrode 10 according to an embodiment of the present disclosure may be included in a battery cell. The electrode 10 may be referred to as an "electrode for lithium secondary battery". The electrode 10 may be a positive electrode and/or a negative electrode.

The electrode 10 may include an electric collector 20. The electric collector 20 may be referred to as an "electrode electric collector". The electric collector 20 may include a metal. For example, the electric collector 20 may be a metal foil. The electric collector 20 may be formed to extend in one direction. For example, the electric collector 20 may be formed to extend in a longitudinal direction.

The electrode 10 may include a slurry 30. The slurry 30 may be referred to as an "electrode material". The slurry 30 may be coated on a portion of the electric collector 20.

The electrode 10 may be divided or partitioned into an area of the electric collector 20 on which the slurry 30 is coated, and a remaining area. For example, the electrode 10 may include a coated part 40 and an uncoated part 50.

The coated part 40 may refer to a portion of the electrode 10 in which the slurry 30 is coated on the electric collector 20. For example, the coated part 40 may include the slurry 30. For example, the coated part 40 may include a portion of the electric collector 20 on which the slurry 30 is coated.

The uncoated part 50 may include a portion of the electric collector 20 on which the slurry 30 is not coated. That is, the uncoated area 50 may indicate a portion of the electrode 10 excluding the coated part 40. The coated part 40 and the uncoated part 50 may be disposed along the length direction of the electric collector 20.

A rolling process is important to implement a battery cell with high capacity and high density during a manufacturing process of the battery cell. The rolling process is a process following a process of coating the slurry in a process of processing the electrode 10. The rolling process refers to a process of pressing the electrode in a thickness direction by passing the electrode 10 between a pair of rolling rollers.

A thickness of the coated part 40 may be greater than a thickness of the uncoated part 50 due to the slurry 30. Therefore, in the process of rolling the electrode 10, a pressure may be applied to the coated part 40, and the pressure may not be applied to the uncoated part 50. Hence, the electric collector 20 of the coated part 40 may be stretched by the pressure, whereas the electric collector 20 of the uncoated part 50 may not be stretched. The electric collector 20 of the coated part 40 may indicate a portion of the electric collector 20 on which the slurry 30 is coated.

For this reason, the electric collector 20 may be deformed at a boundary between the coated part 40 and the uncoated part 50. The deformation of the electric collector 20 may lead to fracture of the electric collector 20. In general, as the electrode density increases and/or a thickness of the electric collector 20 decreases, the probability that the electric collector 20 is deformed or the probability that the electric collector 20 is fractured may increase. The electrode density may indicate a density of the slurry 30.

Due to this, a yield and an operating rate in the rolling process are reduced. In order to solve this, the present disclosure can reduce the tensile strength by heating the uncoated area 50 prior to the rolling process, and thus can suppress the deformation and/or fracture of the electric collector 20 at the boundary between the coated part 40 and the uncoated part 50.

However, if a temperature of the uncoated part 50 is raised too high, there may occur a sticking in which the uncoated part 50 sticks to an ultrasonic heating mold in a process of bonding the uncoated part 50 to an electrode tab through an ultrasonic welding.

When the temperature of the uncoated part 50 is relatively raised to a low level, in the process of bonding the uncoated part 50 to the electrode tab through the ultrasonic welding, the probability of sticking may decrease, but the probability that the electric collector 20 is deformed and/or fractured in the rolling process may increase.

By optimizing output power and configuration of a heating device 70 (see FIG. 2) for heating the uncoated part 50, the present disclosure can simultaneously solve the fracture of the electrode 10 in the rolling process and the sticking in the connecting process of the electrode tab.

The electrode density of the electrode 10 may be 3.6 g/cc to 3.8 g/cc. The electrode density is a mass density of the slurry 30, and may indicate a mass density of the slurry 30 that goes through the rolling process.

The slurry 30 may be a mixture of an active material, a binder, and a conductive agent. The active material may be divided into a cathode active material used for a positive electrode and an anode active material for used for a negative electrode. The active material may indicate at least one of the cathode active material and the anode active material.

The slurry 30 may indicate at least one of a cathode slurry and an anode slurry. The cathode slurry may include the cathode active material, and the anode slurry may include the anode active material.

The electric collector 20 may indicate at least one of a cathode electric collector and an anode electric collector. The cathode electric collector may be an electric collector used for the positive electrode. The anode electric collector may be an electric collector for used for the negative electrode. The electric collector 20 may be formed of a metal foil.

The uncoated part 50 may include a first uncoated part 51 and a second uncoated part 52. The first uncoated part 51 may be connected to the coated part 40. The second uncoated part 52 may be spaced apart from the coated part 40. The first uncoated part 51 may be disposed between the coated part 40 and the second uncoated part 52. The first uncoated part 51 may connect the coated part 40 and the second uncoated part 52.

The first uncoated part 51 may be formed to extend from the coated part 40. The first uncoated part 51 may be configured to have a set tensile strength. For example, the first uncoated part 51 may have the set tensile strength by applying heat to the second uncoated part 52. The tensile strength of the first uncoated part 51 may be 17 kgf/mm$^2$ to 24 kgf/mm$^2$. For example, the tensile strength of the first uncoated part 51 may be 17 kgf/mm$^2$.

The second uncoated part 52 may be formed to extend from the first uncoated part 51. The second uncoated part 52 may be coupled to an electrode tab 80 (see FIG. 5). The second uncoated part 52 may be heat treated so that the first uncoated part 51 has the set tensile strength. Through a heat treatment by the heating process, the tensile strength of the uncoated part 50 may sequentially decrease as it goes from the first uncoated part 51 to the second uncoated part 52.

The second uncoated part 52 may include a tab connection portion 52a and a cut portion 52b. The tab connection portion 52a may be connected to the first uncoated part 51 and may be coupled to the electrode tab 80 (see FIG. 5). The tab connection portion 52a may be configured to have a set tensile strength. The set tensile strength of the first uncoated part 51 may be referred to as a first tensile strength, and the set tensile strength of the tab connection portion 52a may be referred to as a second tensile strength.

The tab connection portion 52a may have the second tensile strength through the heat treatment of the second uncoated part 52. The tensile strength of the uncoated part 50 may decrease as it goes from the first uncoated part 51 toward an end portion of the second uncoated part 52. The first uncoated part 51 may be configured to have the set tensile strength.

That is, the tensile strength of the first uncoated part 51 may be greater than the tensile strength of the tab connection portion 52a, and the tensile strength of the tab connection portion 52a may be greater than a tensile strength of the cut portion 52b. The cut portion 52b may be cut and separated from the tab connection portion 52a after heat treatment is performed (see FIG. 5). The tab connection portion 52a may be referred to as a "second uncoated area". The cut portion 52b may be referred to as a "third uncoated area". The first uncoated part 51 may be referred to as a "first uncoated area".

Figure 2:
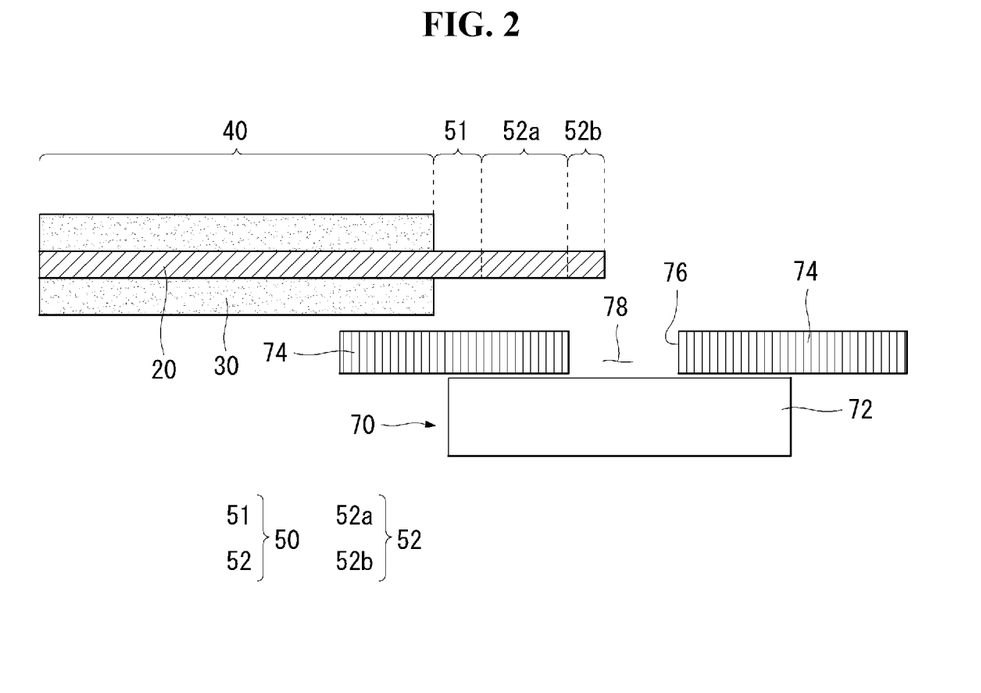
FIG. 2 illustrates an electrode and a heating device according to an embodiment of the present disclosure.

FIG. 2 illustrates an electrode and a heating device according to an embodiment of the present disclosure. FIG. 2 illustrates that the uncoated part 50 is partitioned into a plurality of areas for convenience of description, but the scope of the present disclosure regarding the uncoated part 50 is not limited to FIG. 2. For example, the respective areas of the uncoated part 50 may be consecutively connected without being partitioned.

Referring to FIG. 2, the heating device 70 may heat the electrode 10. The heating device 70 may heat the uncoated part 50 before the electrode 10 is rolled. The heating device 70 may heat the uncoated part 50 by induction heating annealing (IHA). The induction heating may refer to a method of heating a metal object using electromagnetic induction. The heating device 70 may control the temperature of the uncoated part 50 by adjusting the output power.

The heating device 70 may be controlledly interlocked with a device for rolling the electrode 10 (hereinafter, referred to as a "rolling device"). For example, the output power of the heating device 70 may depend on the processing speed of the rolling device. Further, the output power of the heating device 70 may vary depending on the material and the type of the electrode 10.

The heating device 70 may include an induction heating unit 72 and a shielding member 74.

The induction heating unit 72 may allow an induced current to flow through the electrode 10 using an electromagnetic induction action. When an induced current flows in the electrode 10, heat may be generated in the electrode 10. The induction heating unit 72 may include a coil. The induction heating unit 72 may form a high frequency current.

At least a portion of the shielding member 74 may be disposed between the induction heating unit 72 and the electrode 10. For example, at least a portion of the shielding member 74 may be disposed between the induction heating unit 72 and the coated part 40. For example, at least a portion of the shielding member 74 may be disposed between the induction heating unit 72 and the first uncoated part 51. For example, at least a portion of the shield member 74 may be disposed between the induction heating unit 72 and the tab connection portion 52a.

The shielding member 74 may have an effect of shielding a magnetic flux generated in the induction heating unit 72. For example, at least a portion of the magnetic flux (or magnetic field) incident on the shielding member 74 may no longer travel by the shielding member 74. For example, at least a portion of the magnetic flux that is generated in the induction heating unit 72 and is directed toward the coated part 40 may be shielded by the shielding member 74. For example, at least a portion of the magnetic flux that is generated in the induction heating unit 72 and is directed toward the first uncoated part 51 may be shielded by the shielding member 74. For example, at least a portion of the magnetic flux that is generated in the induction heating unit 72 and is directed toward the tab connection portion 52a may be shielded by the shield member 74.

A predetermined portion of the electrode 10 may be heated by the induction heating unit 72. For example, the cut portion 52b may be heated by an induction heating unit 72. The induction heating unit 72 may mainly heat the cut portion 52b. A relative permeability of the shielding member 74 may be equal to or greater than 10. For example, the shielding member 74 may be formed of a material including a ferromagnetic material.

The shielding member 74 may include an exposed portion 76. The exposed portion 76 may form an exposure space 78. The induction heating unit 72 may be exposed to the uncoated part 50 through the exposure space 78. For example, the exposure space 78 may be positioned between the cut portion 52b and the induction heating unit 72. The exposed portion 76 may be referred to as a "magnetic field exposed portion".

The magnetic flux generated by the induction heating unit 72 may pass through the exposed portion 76 and may be incident on the electric collector 20. For example, the magnetic flux passing through the exposure space 78 may be incident on at least a portion of the uncoated part 50.

third length L3 are not limited to the above examples, and can be changed within a range without departing from the purpose of the present disclosure.

TABLE 1

| | | | | Tensile strength per uncoated part area (kgf/mm²) | | | | | | |
|---|---|---|---|---|---|---|---|---|---|---|
| | Intensive heating area | Max heating temp. (° C.) | First uncoated part | First uncoated part after heating/First uncoated part before heating | Tab connection portion after heating | Tab connection portion after heating/Tab connection portion before heating | Cut portion after heating | Cut portion after heating/Cut portion before heating | Wrinkle state | Number of stickings during ultrasonic welding (based on 10 times) | Number of fractures (based on 500 m) |
| Embo. 1 | Cut portion | 220 | 19 | 0.76 | 17 | 0.68 | 10 | 0.4 | ○ | 0 | 0 |
| Embo. 2 | Cut portion | 200 | 20 | 0.8 | 18 | 0.72 | 12 | 0.48 | ○ | 0 | 0 |
| Embo. 3 | Cut portion | 180 | 20 | 0.8 | 19 | 0.76 | 15 | 0.6 | ○ | 0 | 4 |
| Com. Ex. 1 | Entire uncoated part | 220 | 14 | 0.56 | 10 | 0.4 | 10 | 0.4 | Δ | 5 | 0 |
| Com. Ex. 2 | Entire uncoated part | 200 | 16 | 0.64 | 14 | 0.56 | 14 | 0.56 | Δ | 2 | 3 |
| Com. Ex. 3 | Entire uncoated part | 180 | 17 | 0.68 | 17 | 0.68 | 16 | 0.64 | ○ | 0 | 7 |
| Com. Ex. 4 | First uncoated part | 220 | 10 | 0.4 | 17 | 0.68 | 19 | 0.76 | X | 0 | 2 |

(wrinkle of the uncoated part: ○ indicates good, Δ indicates slightly sever, and X indicates very sever)

Through this configuration, the heating device 70 can mainly heat a specific area of the electrode 10.

For example, the heating device 70 may be configured to mainly heat the second uncoated part 52. For example, heat generated in the cut portion 52b may be transferred to the first uncoated part 51. For example, the heating device 70 may be configured to mainly heat the cut portion 52b.

The induction heating unit 72 may face the cut portion 52b through the exposure space 78. For another example, the induction heating unit 72 may face a space outside the cut portion 52b through the exposure space 78. The heating device 70 may locally heat the cut portion 52b through induction heating. Heat generated in the cut portion 52b may be heat-conducted to the first uncoated part 51.

Figure 3:
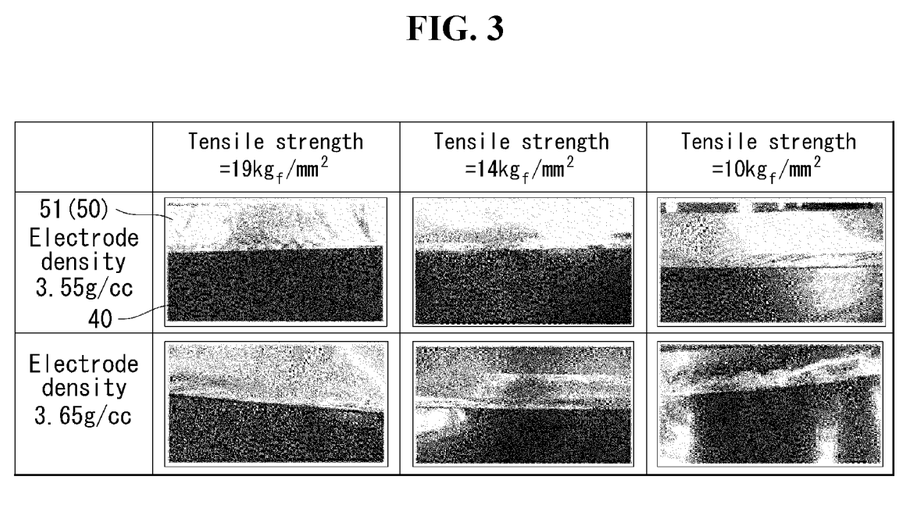
FIG. 3 is a photograph illustrating an electrode depending on an electrode density and a tensile strength after going through a rolling process.

The following is a content of an experiment to know changes in the tensile strength, etc. of the electrode 10 according to the heating process. The content is described with reference to FIGS. 1 to 3 and Table 1. FIG. 3 is a photograph illustrating the electrode 10 depending on the electrode density and the tensile strength after going through the rolling process. The tensile strength illustrated in FIG. 3 may indicate the tensile strength of the first uncoated part 51.

Referring to FIGS. 1 to 3, a length of the first uncoated part 51 may be a first length L1, a length of the tab connection portion 52a may be a second length L2, and a length of the cut portion 52b may be a third length L3. A length of the uncoated part 50 may be measured based on a direction in which the uncoated part 50 extends from the coated part 40.

For example, a total length of the uncoated part 50 may be 15 mm. The first length L1 may be 5 mm. A length of the second uncoated part 52 is a sum of the second length L2 and the third length L3, and may be 10 mm. For example, the second length L2 may be 7 mm, and the third length L3 may be 3 mm. The first length L1, the second length L2, and the Table 1 shows, when an intensive heating area and a maximum heating temperature of the uncoated part 50 change, the tensile strength and the wrinkle state of the uncoated part 50 after the rolling process, the number of stickings generated in the ultrasonic welding process (per 10 ultrasonic welding operations), and the number of fractures of the electrode 10 after the rolling process (in the process of transporting the electrode 500m). In Table 1, the tensile strength of the uncoated part 50 before heating the uncoated part 50 is 25 kgf/mm². In Table 1, the electrode density of the electrode 10 after the rolling process is 3.65 g/cc. In Table 1, the tensile strength of the uncoated part 50 before heating may be the same as a tensile strength of the electric collector 20 of the coated part 40 before heating.

Referring to FIGS. 1 to 3 and Table 1, even if only a specific area of the uncoated part 50 is selectively heated, the tensile strengths of all the areas of the uncoated part 50 may change. This may be due to the thermal conductivity of the uncoated part 50.

The wrinkle of the uncoated part 50 may occur at the first uncoated part 51 adjacent to the boundary between the coated part 40 and the uncoated part 50 due to a difference between an elongation of the coated part 40, to which the pressure is directly applied, and an elongation of the uncoated part 50 to which the pressure is not applied. In this instance, the tensile strength of the first uncoated part 51 may affect the generation of wrinkle.

When comparing an embodiment 1 with a comparative example 4, in the embodiment 1, the cut portion 52b, which is an end portion of the uncoated part 50, was intensively heated, and a tensile strength of the first uncoated area 51 was 19 kgf/mm², and in the comparative example 4, the first uncoated part 51 was intensively heated, and a tensile strength of the first uncoated part 51 was 10 kgf/mm². Although the tensile strength of the first uncoated part 51 in the comparative example 4 was significantly less than the tensile strength of the first uncoated part 51 in the embodiment 1, a wrinkle state in the embodiment 1 was better than a wrinkle state in the comparative example 4.

As in the comparative example 4, when the first uncoated part 51 is intensively heated, heat generated in the first uncoated part 51 is transferred to the electric collector 20 of the coated part 40, and hence a difference between the tensile strength of the electric collector 20 at the coated part 40 and the tensile strength of the first uncoated part 51 may not be large. If the difference between the tensile strength of the electric collector 20 at the coated part 40 and the tensile strength of the first uncoated part 51 is not large, the first uncoated area 51 may be more likely to be deformed in the rolling process. When comparing the comparative example 4 with a comparative example 1, although a tensile strength (14 kgf/mm$^2$) of the first uncoated part 51 in the comparative example 1 was greater than the tensile strength (10 kgf/mm$^2$) of the first uncoated part 51 in the comparative example 4, a wrinkle state in the comparative example 1 was better than the wrinkle state in the comparative example 4.

Since the intensive heating area in the comparative example 1 was the entire uncoated part 50 and the intensive heating area in the comparative example 4 was the first uncoated part 51, the heat transferred to the electric collector 20 of the coated part 40 in the comparative example 1 was less than the heat transferred to the electric collector 20 of the coated part 40 in the comparative example 4. Thus, a difference in the tensile strength between the electric collector 20 of the coated part 40 and the first uncoated part 51 in the comparative example 1 was greater than a difference in the tensile strength between the electric collector 20 of the coated part 40 and the first uncoated part 51 in the comparative example 4. As a result, it could be seen that the wrinkle state in the comparative example 1 was better than the wrinkle state in the comparative example 4.

As in the embodiment 1, when the cut portion 52b, which is the end portion of the uncoated part 50, was intensively heated, heat generated in the cut portion 52b may reach the first uncoated part 51 via the tab connection portion 52a. Since heat is provided to the first uncoated part 51 through heat conduction, a temperature of a portion of the first uncoated part 51 adjacent to the tab connection portion 52a may be higher than a temperature of a portion of the first uncoated part 51 adjacent to the coated part 40. That is, compared to the comparative example 4, even if the tensile strength of the first uncoated part 51 becomes lower, the tensile strength of the electric collector 20 of the coated part 40 may be relatively slightly reduced.

A method of preventing the deformation of the first uncoated part 51 may be to maintain the tensile strength of the electric collector 20 at the coated part 40 while reducing the tensile strength of the first uncoated part 51 by increasing the temperature of the first uncoated part 51. As in the embodiment 1, if heat is conducted from a portion opposite to the coated part 40 in the first uncoated part 51, the wrinkle state may be good.

Since heat is conducted from a portion opposite to the coated part 40 in the first uncoated part 51 toward the coated part 40, the tensile strength of the electric collector 20 at the coated part 40 may be greater than the tensile strength of the first uncoated part 51, the tensile strength of the first uncoated part 51 may be greater than the tensile strength of the tab connection portion 52a, and the tensile strength of the tab connection portion 52a may be greater than the tensile strength of the cut portion 52b.

When comparing a comparative example 2 with a comparative example 3, in the comparative example 2, a tensile strength of the first uncoated part 51 was 16 kgf/mm$^2$, and a wrinkle state was slightly severe, and in the comparative example 3, a tensile strength of the first uncoated part 51 was 17 kgf/mm$^2$, and a wrinkle state was good. Even if the entire uncoated part 50 is intensively heated in the comparative examples 2 and 3, a difference between the tensile strength of the electric collector 20 of the coated part 40 and the tensile strength of the first uncoated part 51 in the comparative example 2 may be less than a difference between the tensile strength of the electric collector 20 of the coated part 40 and the tensile strength of the first uncoated part 51 in the comparative example 3 by heat transferred to the electric collector 20 of the coated part 40 at the first uncoated part 51.

It can be seen from Table 1 that in the electrode 10 with the electrode density of 3.65 g/cc, a degree of wrinkle generation of the uncoated part 50 is sever when the tensile strength of the first uncoated part 51 is less than 17 kgf/mm$^2$. That is, referring to FIG. 1, in the comparative examples 1, 2 and 4, the tensile strength of the first uncoated part 51 was less than 17 kgf/mm$^2$, and the wrinkle state was not good.

On the other hand, in the comparative example 3 and the embodiments 1, 2, and 3, the tensile strength of the first uncoated part 51 is between 17 kgf/mm$^2$ and 24 kgf/mm$^2$, and the wrinkle state is good. That is, when the tensile strength of the first uncoated part 51 is between 17 kgf/mm$^2$ and 24 kgf/mm$^2$, the wrinkle of the first uncoated part 51 can be improved.

From a correlation between the tensile strength and the wrinkle state shown in Table 1, it may be understood that when the tensile strength of the first uncoated part 51 is reduced to a predetermined level or less, the uncoated part 50 is softened and is vulnerable to the wrinkle generation.

However, as can be seen from FIG. 3, in the electrode with the lower electrode density of 3.55 g/cc, as the pressure applied to the coated part 40 decreases, a difference in the elongation between the coated part 40 and the uncoated part 50 decreases. Hence, the wrinkle difference depending on the tensile strength of the first uncoated part 51 can be relatively reduced compared to the electrode with the higher electrode density.

Referring to FIG. 3, the electrode 10 with the electrode density of 3.55 g/cc in the rolling process may be provided with the relatively less pressure than the electrode 10 with the electrode density of 3.65 g/cc. Therefore, a difference in the elongation between the coated part 40 and the uncoated part 50 in the electrode 10 with the electrode density of 3.55 g/cc may be less than a difference in the elongation between the coated part 40 and the uncoated part 50 in the electrode 10 with the electrode density of 3.65 g/cc.

For this reason, the wrinkle state generated in the electrode 10 with the lower electrode density may be better than the wrinkle state generated in the electrode 10 with the higher electrode density.

If the tensile strength of the first uncoated part 51 is within a predetermined range and is greater than the tensile strength of the tab connection portion 52a, the wrinkle state of the uncoated part 50 may be good. For example, when comparing the embodiments 1, 2 and 3 and the comparative example 3 with the comparative examples 1, 2 and 4, the wrinkle state of the uncoated part 50 may be good when the tensile strength of the first uncoated part 51 is within a range greater than 16.5 kgf/mm$^2$ and less than 20.5 kgf/mm$^2$. In other words, when a ratio of the tensile strength of the first uncoated part 51 to the tensile strength of the electric collector 20 of the coated part 40 is 0.65 to 0.85, the wrinkle state of the uncoated part 50 may be good.

The tensile strength of the electric collector 20 of the coated part 40 may not change by the heating process. For example, in Table 1, when the intensive heating area is the cut portion 52b, the heat transferred to the coated part 40 may be insignificant since heat is transferred to the coated part 40 via the tab connection portion 52a and the first uncoated part 51. Therefore, the tensile strength of the electric collector 20 of the coated part 40 may not change by the heating process.

In the sticking generated in the ultrasonic welding process, the ultrasonic welding is performed on the tab connection portion 52a, and thus the tensile strength of the tab connection portion 52a may be important. As can be seen from Table 1, in the embodiments 1 to 3 and the comparative examples 3 and 4 in which the tensile strength of the tab connection portion 52a is 15 kgf/mm$^2$ or more, no sticking occurred in ten tests. On the other hand, in the comparative examples 1 and 2 in which the tensile strength of the tab connection portion 52a is less than 15 kgf/mm$^2$, the sticking occurred. As the tensile strength of the tab connection portion 52a decreases, the number of stickings may increase.

When the tensile strength of the tab connection portion 52a is not greater than the tensile strength of the first uncoated part 51, the wrinkle state of the uncoated part 50 is not very severe. Therefore, a condition in which the tensile strength of the tab connection portion 52a is less than 20 kgf/mm$^2$ may be a necessary condition for the wrinkle state of the uncoated part 50 to be good. That is, a condition in which the tensile strength of the tab connection portion 52a is between 14.5 kgf/mm$^2$ and 19.5 kgf/mm$^2$ may be a necessary condition for the uncoated part 50 in which the number of stickings decreases and the wrinkle state is good. In other words, when a ratio of the tensile strength of the tab connection portion 52a to the tensile strength of the electric collector 20 of the coated part 40 is 0.55 to 0.8, the sticking can be suppressed.

The fracture generated in the rolling process may be most affected by the tensile strength of the cut portion 52b. In Table 1, in the embodiments 1 and 2 and the comparative example 1 in which the tensile strength of the cut portion 52b is 13 kgf/mm$^2$ or less, no fracture occurred. This is because the fracture occurring in the rolling process starts at the cut portion 52b, on which a stress is concentrated, and the fracture probability decreases if the tensile strength of the cut portion 52b is reduced.

When comparing the embodiment 2 with the embodiment 3, in the embodiment 2, the tensile strength of the tab connection portion 52a was 18 kgf/mm$^2$ and no fracture occurred, whereas in the embodiment 3, the tensile strength of the tab connection portion 52a was 19 kgf/mm$^2$ and the fracture occurred four times. Hence, it can be seen that a condition in which the tensile strength of the tab connection portion 52a is equal to or less than 18.5 kgf/mm$^2$ is advantageous in terms of fracture.

Combining the above results, in the electrode 10 with the electrode density of 3.65 g/cc, when the tensile strength of the first uncoated part 51 is between 16.5 kgf/mm$^2$ and 20.5 kgf/mm$^2$, and the tensile strength of the tab connection portion 52a is between 14.5 kgf/mm$^2$ and 18.5 kgf/mm$^2$ while the cut portion 52b is intensively heated, the wrinkle state, the sticking, and the fracture of the uncoated part 50 can be improved.

In other words, in the electrode 10 with the electrode density of 3.65 g/cc, when a ratio of the tensile strength of the first uncoated part 51 to the tensile strength of the electric collector 20 of the coated part 40 is 0.65 to 0.85, and a ratio of the tensile strength of the tab connection portion 52a to the tensile strength of the electric collector 20 of the coated part 40 is 0.55 to 0.75 while the cut portion 52b is intensively heated, the wrinkle state, the sticking, and the fracture of the uncoated part 50 can be improved.

Conditions in which the tensile strength of the first uncoated part 51 is greater than the tensile strength of the tab connection portion 52a, and the tensile strength of the tab connection portion 52a is greater than the tensile strength of the cut portion 52b may be the most advantageous conditions for the wrinkle state, the sticking, and the fracture of the uncoated part 50.

The second length L2 which is the length of the tab connection portion 52a may be greater than the first length L1 which is the length of the first uncoated part 51. When the second length L2 is greater than the first length L2, the cut portion 52b is mainly intensively heated, and thus a difference between the tensile strength of the tab connection portion 52a and the tensile strength of the first uncoated part 51 can be effectively formed.

Since the cut portion 52b is removed before attachment of the electrode tab 80 (see FIG. 5), the cut portion 52b may not directly affect a performance of the battery cell. However, the cut portion 52b may have an effect on improving the fracture in the rolling process.

Figure 4:
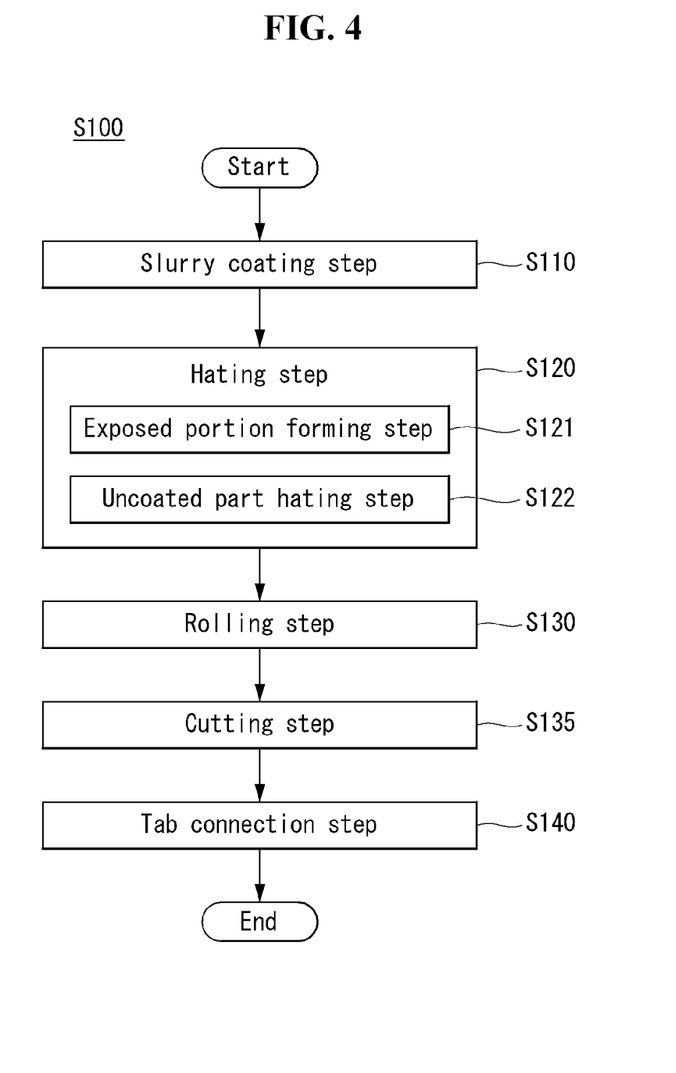
FIG. 4 is a flow chart illustrating a method of manufacturing an electrode according to an embodiment of the present disclosure.

A method of processing an electrode of the battery cell is described below. A method S100 of manufacturing an electrode according to an embodiment of the present disclosure may be referred to as a method of manufacturing an electrode for lithium secondary battery.

Referring to FIGS. 1 to 4, a method S100 of manufacturing an electrode according to an embodiment of the present disclosure may comprise a slurry coating step S110. In the step S110, a slurry 30 may be coated on at least one surface of an electric collector 20.

The electric collector 20 may be formed of a conductive metal thin plate. The electric collector 20 may include a thin metal plate. For example, the thin metal plate may be formed of aluminum. The slurry 30 may be coated on one surface or both surfaces of the electric collector 20. Through the step S110, an electrode 10 may be divided into a coated part 40 and an uncoated part 50.

The area of the electrode 10 may be divided into an area in which the coated part 40 40 is positioned and an area in which the uncoated part 50 is positioned. The coated part 40 may be referred to as a "coated area". The uncoated part 50 may be referred to as a "uncoated area". For example, the electrode 10 may be divided into a coated area 40 and an uncoated area 50.

The method S100 of manufacturing the electrode according to an embodiment of the present disclosure may comprise a hating step S120. In the step S120, a heating device 70 may heat the electrode 10. For example, in the step S120, the heating device 70 may mainly heat a cut portion 52b. In other words, in the step S120, the heating device 70 may mainly heat an end portion of the uncoated part 50. That is, in the step S120, the heating device 70 may mainly heat the end portion of the uncoated area 50.

The heating step S120 may comprise a step S121 of forming an exposed portion. In the step S121, an exposure space 78 may be formed through a shielding member 74 so that a magnetic flux generated by an induction heating unit 72 travels while being limited to a predetermined range. In the step S121, a magnetic field formed by the induction heating unit 72 may be distributed while being limited to a predetermined range.

The heating step S120 may comprise a step S122 of heating an uncoated part. In the step S122, a portion of the magnetic flux generated by the induction heating unit 72 may be shielded by the shielding member 74, and other portion may pass through the exposure space 78 and may be incident on the uncoated part 50. For example, in this step S122, the induction heating unit 72 may mainly heat the cut portion 52b that is the end portion of the uncoated part 50.

In the heating step S120, the induction heating unit 72 may heat the uncoated part 50 so that a portion of the uncoated part 50 has a set tensile strength. For example, the cut portion 52b may be heated so that a tab connection portion 52a has a second tensile strength that is a set tensile strength. For example, the cut portion 52b may be heated so that a first uncoated part 51 has a first tensile strength that is a set tensile strength. For example, the cut portion 52b may be heated so that the first uncoated portion 51 has the first tensile strength and the tab connection portion 52a has the second tensile strength.

The method S100 of manufacturing the electrode according to an embodiment of the present disclosure may comprise a rolling step S130. The rolling step S130 may be a step of compressing the electrode 10 to increase an adhesive force between the slurry 30 and the electric collector 20. Through the rolling step S130, the electrode 10 may be compressed to a set thickness.

The method S100 of manufacturing the electrode according to an embodiment of the present disclosure may comprise a cutting step S135 of cutting the cut portion 52b. In the step S135, the cut portion 52b may be separated from the tab connection portion 52a.

The method S100 of manufacturing the electrode according to an embodiment of the present disclosure may comprise a tab connection step S140. The tab connection step S140 may be performed after the rolling step S130. In the tab connection step S140, an electrode tab 80 (see FIG. 5) may be connected to the uncoated part 50. In the tab connection step S140, the electrode tab 80 (see FIG. 5) may be connected to the uncoated area 50. In the step S140, the tab connection portion 52a may be connected to the electrode tab 80 (see FIG. 5).

Figure 5:
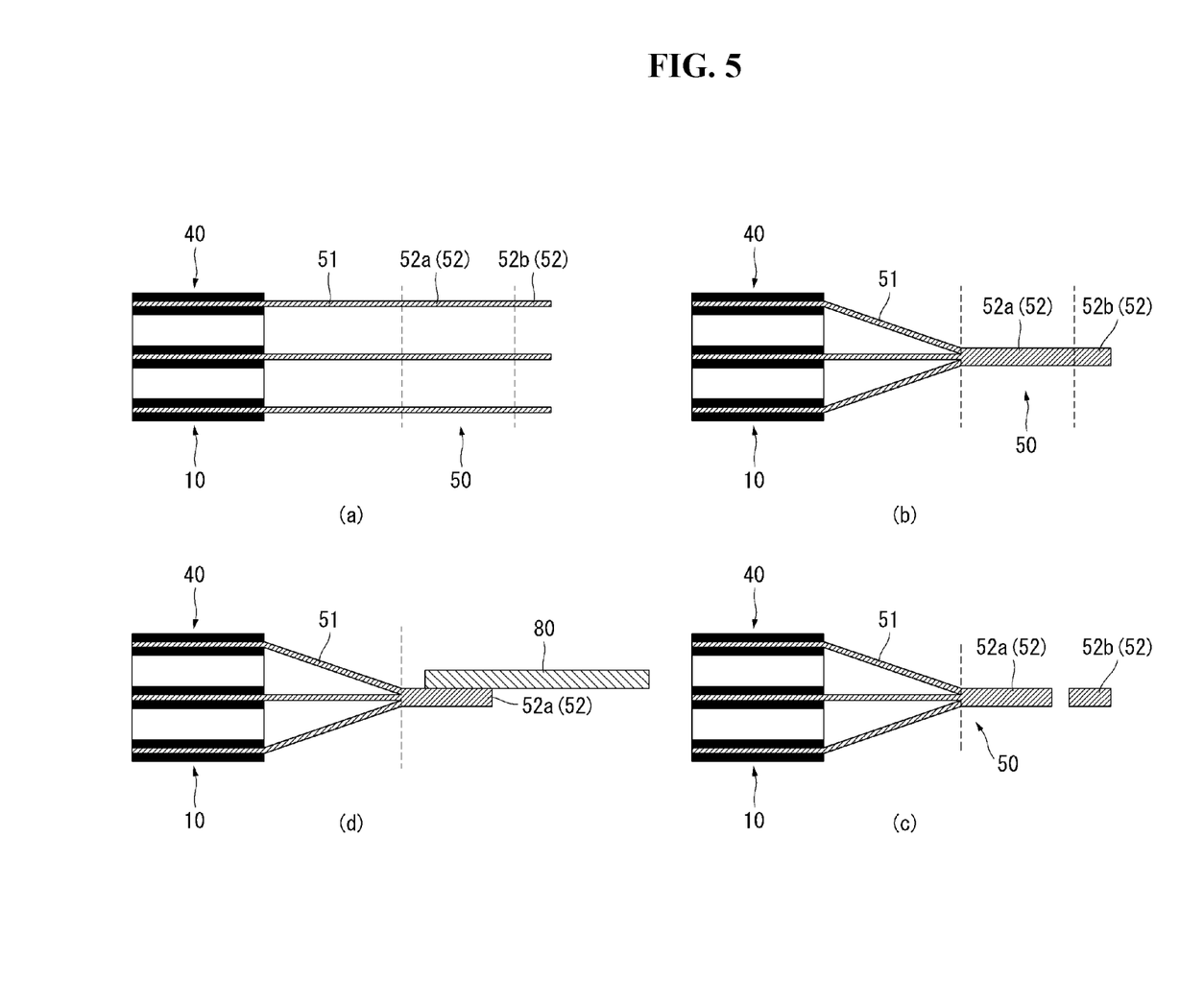
FIG. 5 illustrates a process of connecting an electrode tab to an electrode according to an embodiment of the present disclosure.

FIG. 5 illustrates that the respective areas of the uncoated part 50 are partitioned by dotted lines for convenience of description, by way of example, but the respective areas may not be partitioned and may be consecutively connected.

Referring to (a) and (b) of FIG. 5, the plurality of second uncoated parts 52 may be laminated and welded. Referring to (c) of FIG. 5, the cut portion 52b may be separated and removed from the tab connection portion 52a. Referring to (d) of FIG. 5, the tab connection portion 52a may be connected or coupled to the electrode tab 80 through the welding in a state where the cut portion 52b is removed from the second uncoated part 52. Hence, the electrode 10 and the electrode tab 80 may be connected.

Although the embodiments have been described with reference to a number of illustrative embodiments thereof, numerous other modifications and embodiments may be devised by those skilled in the art that will fall within the scope of the principles of the present disclosure. In particular, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art. The scope of the present disclosure should be determined by rational interpretation of the appended claims, and all modifications within an equivalent scope of the present disclosure are included in the scope of the present disclosure.

What is claimed is:

1. An electrode for lithium secondary battery comprised of an electric collector formed of a metal and a slurry coated on a portion of the electric collector, the electrode for lithium secondary battery comprising:
   a coated part including the portion of the electric collector, on which the slurry is coated, and the slurry; and
   an uncoated part including a remaining portion of the electric collector on which the slurry is not coated, the uncoated part extending from the coated part,
   wherein the uncoated part includes:
   a first uncoated part extended from the coated part; and
   a second uncoated part extended from the first uncoated part, the second uncoated part including a tab connection portion coupled to an electrode tab,
   wherein a tensile strength of the first uncoated part is greater than a tensile strength of the tab connection portion, and
   wherein a ratio of the tensile strength of the first uncoated part to a tensile strength of the portion of the electric collector on which the slurry is coated is 0.65 to 0.85,
   wherein a length of the first uncoated part in a direction in which the first uncoated part extends is less than a length of the tab connection portion in a direction in which the second uncoated part extends,
   wherein the first uncoated part and the second uncoated part form an integrated body with the coated part.

2. The electrode for lithium secondary battery of claim 1, wherein a ratio of the tensile strength of the tab connection portion to the tensile strength of the portion of the electric collector on which the slurry is coated is 0.55 to 0.75.

3. The electrode for lithium secondary battery of claim 1, wherein an electrode density of the electrode for lithium secondary battery is 3.6 to 3.8 g/cc, and
   wherein the tensile strength of the first uncoated part is 16.5 to 20.5 kgf/mm2.

4. The electrode for lithium secondary battery of claim 1, wherein an electrode density of the electrode for lithium secondary battery is 3.6 to 3.8 g/cc, and
   wherein the tensile strength of the tab connection portion is 14.5 to 18.5 kgf/mm2.

* * * * *